US012578739B2

(12) United States Patent
Ogawa et al.

(10) Patent No.: US 12,578,739 B2
(45) Date of Patent: Mar. 17, 2026

(54) VEHICLE CONTROL SYSTEM

(71) Applicant: Daifuku Co., Ltd., Osaka (JP)

(72) Inventors: Daisuke Ogawa, Hinocho (JP); Yuya Hirao, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 61 days.

(21) Appl. No.: 18/646,929

(22) Filed: Apr. 26, 2024

(65) Prior Publication Data

US 2024/0361783 A1 Oct. 31, 2024

(30) Foreign Application Priority Data

Apr. 28, 2023 (JP) ................................. 2023-075058

(51) Int. Cl.
| | |
|---|---|
| *G05D 1/00* | (2024.01) |
| *G05D 1/24* | (2024.01) |
| *G05D 1/69* | (2024.01) |
| *G05D 1/86* | (2024.01) |
| *H04B 17/318* | (2015.01) |

(Continued)

(52) U.S. Cl.
CPC ................. *G05D 1/86* (2024.01); *G05D 1/24* (2024.01); *G05D 1/69* (2024.01); *H04B 17/318* (2015.01); *H04W 4/44* (2018.02); *G05D 2107/70* (2024.01); *G05D 2111/30* (2024.01)

(58) Field of Classification Search
CPC .. G05D 1/86; G05D 1/24; G05D 1/69; G05D 2107/70; G05D 2111/30; G05D 1/226; G05D 1/2446; G05D 1/646; G05D 2105/28; G05D 2111/10; G05D 1/6987; G05D 1/225; G05D 2109/10; G05D 1/247; G05D 1/80; G05D 2111/32; H04B 17/318; H04W 4/44; H04W 4/40; G08G 1/20; G08G 1/096775; G07C 5/08
See application file for complete search history.

(56) References Cited

U.S. PATENT DOCUMENTS 5,694,322 A * 12/1997 Westerlage .......... G07B 15/063
340/870.07
6,321,068 B1 * 11/2001 Zamat .................. H04B 17/318
455/69

(Continued)

FOREIGN PATENT DOCUMENTS

| JP | 2000306194 A | 11/2000 |
|---|---|---|
| JP | 5446055 B2 | 3/2014 |

(Continued)

*Primary Examiner* — Masud Ahmed
(74) *Attorney, Agent, or Firm* — The Webb Law Firm

(57) ABSTRACT

A controller in a vehicle control system includes a communication state determiner that determines a communication state between a facility communicator and a vehicle communicator in each vehicle, and a recorder. When the communication state determiner determines that the communication state between the facility communicator and the vehicle communicator in any vehicle has a communication failure, the controller obtains vehicle state information indicating a state of a target vehicle being the vehicle having the communication failure at at least one data obtaining point in a target period including at least one of a failure-occurrence point or a failure-recovery point of the communication failure, and records the vehicle state information in the recorder.

7 Claims, 5 Drawing Sheets

(51) Int. Cl.
    *H04W 4/44*         (2018.01)
    *G05D 107/70*     (2024.01)
    *G05D 111/30*     (2024.01)

(56)                References Cited

U.S. PATENT DOCUMENTS

| | | | | |
|---|---|---|---|---|
| 6,332,077 B1 * | 12/2001 | Wu | H04W 8/08 | |
| | | | 455/434 | |
| 6,611,755 B1 * | 8/2003 | Coffee | B28C 9/00 | |
| | | | 455/526 | |
| 7,305,287 B2 * | 12/2007 | Park | G06Q 10/08 | |
| | | | 318/587 | |
| 8,401,573 B2 * | 3/2013 | Shrum, Jr. | H04W 48/04 | |
| | | | 455/445 | |
| 8,577,360 B2 * | 11/2013 | Olsson | H04W 76/18 | |
| | | | 455/425 | |
| 9,280,154 B2 | 3/2016 | Nagasawa | | |
| 10,629,005 B1 * | 4/2020 | Brown | G07C 5/0841 | |
| 2013/0197719 A1 * | 8/2013 | Nagasawa | B61L 27/20 | |
| | | | 701/2 | |
| 2013/0297207 A1 * | 11/2013 | Mason | G08G 1/202 | |
| | | | 701/400 | |

FOREIGN PATENT DOCUMENTS

| | | |
|---|---|---|
| JP | 2019128672 A | 8/2019 |
| WO | 2018043245 A1 | 3/2018 |

* cited by examiner

VEHICLE CONTROL SYSTEM

CROSS-REFERENCE TO RELATED APPLICATION

This application claims priority to Japanese Patent Application No. 2023-075058 filed Apr. 28, 2023, the disclosure of which is hereby incorporated by reference in its entirety.

BACKGROUND OF THE INVENTION

Field of the Invention

The present invention relates to a vehicle control system.

Description of Related Art

Japanese Patent No. 5446055 describes a vehicle control system (carriage system) that includes multiple vehicles (carriages) and a controller (ground controller) that transmits travel commands to the vehicles. The vehicle control system communicates wirelessly with the vehicles and the controller. Each vehicle periodically provides information including its position to the controller. Based on the positional information provided by each vehicle, the controller transmits travel commands to the vehicles to avoid interference between the vehicles. When detecting a failure in communication with any of the vehicles, or more specifically, when failing to receive the positional information from any vehicle, the controller transmits a stop command to the vehicle. Each vehicle stops when detecting a failure in communication with the controller. Thus, when a failure in communication between the controller and any vehicle occurs, each of the controller and the vehicle controls the vehicle to stop. The multiple vehicles can thus avoid interfering with each other.

SUMMARY OF THE INVENTION

In wireless communication such as radio communication, communication failures may occur when a shield against radio waves is located between communicating parties, or when communication is performed with many terminals, or in other words, when traffic congestion occurs. The communication failures are often recovered by moving vehicles. In the above literature, however, when communication failures occur successively in multiple communication cycles, the vehicles are stopped. When the vehicles stop more frequently, the travel efficiency of the vehicles in the vehicle control system is more likely to decrease. Communication failures are highly likely to be reproduced at some locations or time. When the cause of such highly reproducible communication failures is clarified and measures are taken against the clarified cause, the travel efficiency of the vehicle in the vehicle control system can be improved. However, the above literature does not describe any improvement on the communication environment.

In response to the above background, achievement is awaited for a vehicle control system for analyzing or investigating, as appropriate, the situations or the causes of communication failures between a controller and multiple vehicles.

In response to the above, a vehicle control system includes a plurality of vehicles that travel along a predetermined travel path, a controller that generates a travel command for each of the plurality of vehicles to control travel of the plurality of vehicles, and a communication system that communicates with the plurality of vehicles and the controller. The communication system includes a facility communicator that communicates wirelessly with the plurality of vehicles. Each of the plurality of vehicles includes a vehicle communicator that communicates wirelessly with the facility communicator. The controller includes a communication state determiner that determines a communication state between the facility communicator and the vehicle communicator in each of the plurality of vehicles, and a recorder. The controller obtains, when the communication state determiner determines that the communication state between the facility communicator and the vehicle communicator in at least one vehicle of the plurality of vehicles has a communication failure, vehicle state information indicating a state of at least one target vehicle being the at least one vehicle having the communication failure at at least one data obtaining point in a target period including at least one of a failure-occurrence point or a failure-recovery point of the communication failure, and records the vehicle state information in the recorder.

In this structure, when a communication failure occurs between any of the vehicles and the communication system, the controller obtains vehicle state information for the target period and records the information in the recorder after the communication failure is recovered. Thus, when a communication failure occurs, the vehicle state information used to analyze the situations or the causes of the failure can be automatically collected and recorded. This achieves the vehicle control system that can analyze or investigate the situations or the causes of communication failures between the controller and the multiple vehicles based on the vehicle state information recorded in the recorder.

Further aspects and features of the vehicle control system will be apparent from exemplary and nonlimiting embodiments described below with reference to the drawings.

BRIEF DESCRIPTION OF THE DRAWINGS

The terms FIG., FIGS., Figure, and Figures are used interchangeably in the specification to refer to the corresponding figures in the drawings.

DESCRIPTION OF THE INVENTION

Figure 1:
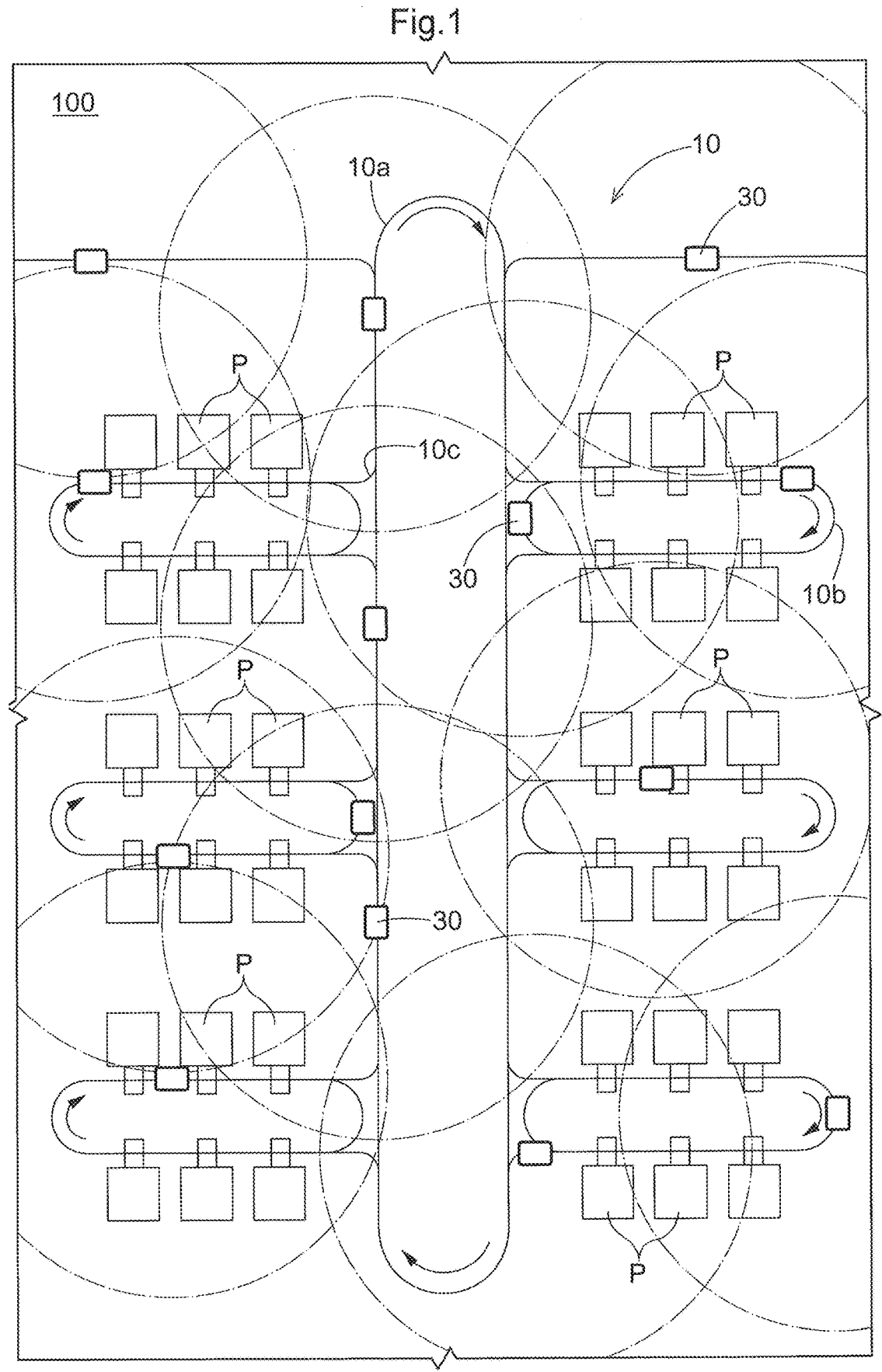
FIG. 1 is a schematic plan view of an article transport facility.

A vehicle control system according to an embodiment is described below with reference to the drawings, using an article transport facility as an example. FIG. 1 shows an example of an article transport facility 100 including the vehicle control system. The article transport facility 100 includes a pair of travel rails (not shown) extending along a travel path 10 for vehicles 30 serving as article transport vehicles to transport articles. The article transport facility 100 includes multiple vehicles 30, each of which travels along the predefined travel path 10 while being guided by the travel rails. Articles to be transported by the vehicles 30 are, for example, front opening unified pods (FOUPs) that contain semiconductor substrates or glass substrates to be used as materials for displays. The article transport facility 100 further includes a storage (not shown) for semiconductor substrates, and article processors P that perform various processes for forming, for example, circuitry on a semiconductor substrate. FIG. 1 shows a portion of the travel path 10 including one primary path 10a in the form of a loop, secondary paths 10b in the form of loops and each passing through the multiple article processors P, and connection paths 10c that connect the primary path 10a and the secondary paths 10b. In the present embodiment, the vehicles 30 travel unidirectionally along the travel path 10 in the direction indicated by the arrows.

Although not shown, for example, each vehicle 30 is a ceiling-hung transport vehicle including a traveler and a body. The traveler includes a pair of travel wheels driven by an electric drive motor to rotate. The travel rails are hung from the ceiling and have upper surfaces serving as traveling surfaces on which the travel wheels roll. The traveler travels along the travel path 10 with the travel wheels rolling on the traveling surfaces. The body is located below the travel rails and hung from the traveler. The body includes an article support that can be raised and lowered relative to the body and supports an article being hung, and a gripper that grips the article. The vehicle 30 grips an article with the gripper, and travels while raising the article support to transport the article.

Instead of a ceiling-hung transport vehicle, the article transport vehicle may be a vehicle that travels on the floor (ground). In this case, instead of a tracked vehicle that travels along a track such as a rail, the vehicle 30 that travels along a predetermined travel path may be a trackless vehicle that detects, for example, a guide path laid on the floor and travels along the guide path.

Although not shown, the article transport facility 100 according to the present embodiment includes mounts that are located nearer the floor and receive articles. Each vehicle 30 transfers articles to and from the mounts while lowering the article support. The mounts are located at multiple positions in the article transport facility 100. For example, the mounts are located in the article processors P shown in FIG. 1 or in an article storage not shown in FIG. 1.

The traveler includes a drive motor that drives the travel wheels and a drive circuit. The body includes actuators such as an actuator that raises and lowers the article support and an actuator that drives a gripper to grip an article, and a drive circuit for each actuator. The drive motor, each actuator, and the drive circuit that drives the drive motor and each actuator correspond to a drive unit 35 in FIG. 2.

A feed line (not shown) extends along the travel rails. Each vehicle 30 includes a power receiver (not shown) that contactlessly receives driving power from the feed line with a wireless feeding technique. Power to, for example, the drive motor, each actuator, and the drive circuit, is contactlessly fed to the power receiver in the vehicle 30 through the feed line.

Figure 2:
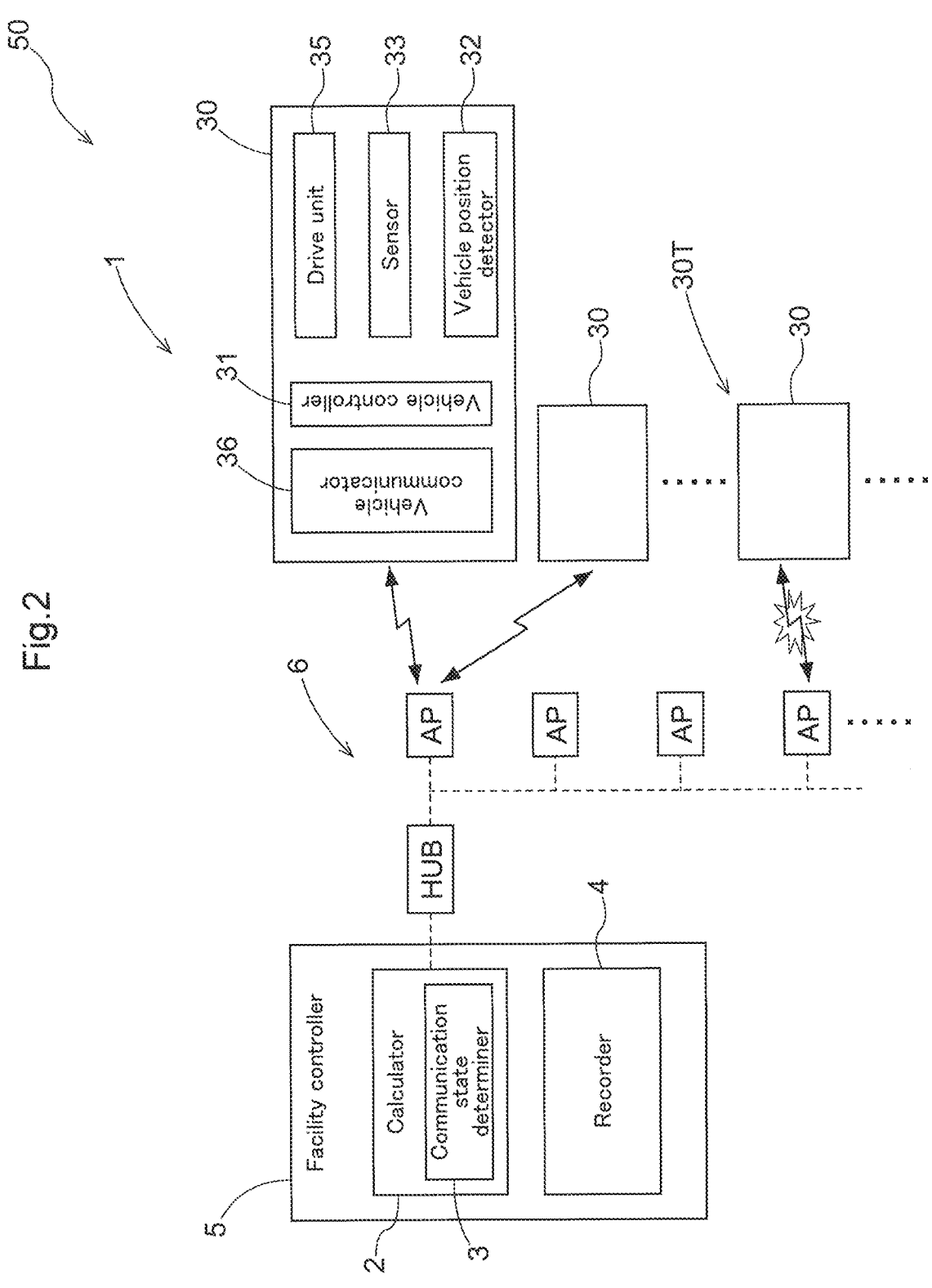
FIG. 2 is a schematic block diagram of a vehicle control system.

As shown in FIG. 2, the article transport facility 100 includes a controller that generates travel commands to cause each vehicle 30 to at least travel to the destination, and controls travel of the vehicle 30. The controller is, for example, a facility controller 5 that manages the entire article transport facility 100. The facility controller 5 is referred to as, for example, a material control processor (MCP).

The functional component serving as the core of the facility controller 5 is a calculator 2. The calculator 2 generates transport commands for the multiple vehicles 30, and controls the vehicles 30. Based on the transport commands from the facility controller 5, the vehicles 30 transport articles between different mounts. The transport commands include an allocation command to pick up an article and a transport command to transport the picked-up article to the destination. In addition to the transport command, the facility controller 5 further transmits a movement command to cause each vehicle 30 to travel without transportation to the vehicle 30. The movement command includes a command to move each vehicle 30 to, for example, avoid interference with another vehicle 30, and a command to move each vehicle 30 to allow communication described later. The facility controller 5 provides the destination to each vehicle 30 with both the transport command and the movement command. More specifically, the transport command includes a travel command to cause each vehicle to travel to a destination, and the facility controller 5 generates a travel command to each vehicle 30 to control travel of the vehicle.

As shown in FIG. 2, each vehicle 30 includes a vehicle communicator 36. The facility controller 5 and each vehicle 30 can communicate wirelessly (e.g., with radio waves) with each other. The calculator 2 transmits and receives information to and from a vehicle controller 31 in each vehicle 30 using a facility communicator 6 and the vehicle communicator 36. Although described in detail later, the facility communicator 6 includes at least one access point AP. Although the calculator 2 also controls communication in this embodiment, the facility controller 5 may further include a communication controller separate from the calculator 2.

More specifically, a vehicle control system 50 includes a communication system 1 that communicates with the multiple vehicles 30 and the facility controller 5, and the communication system 1 includes the facility communicator 6 that communicates wirelessly with the vehicles 30. Each vehicle 30 includes the vehicle communicator 36 that communicates wirelessly with the facility communicator 6. The vehicle communicator 36 may be included in the communication system 1, or may be independent of the communication system 1. When the vehicle communicator 36 is included in the communication system 1, the communication system 1 includes the facility communicator 6 and the vehicle communicator 36. When the vehicle communicator 36 is independent of the communication system 1, the communication system 1 includes at least the facility communicator 6.

In either case, the facility communicator 6 includes all the components in the communication system 1 except the vehicle communicator 36. In the present embodiment, as shown in FIG. 2, the facility communicator 6 includes multiple access points AP. The access points AP are connected to a hub HUB or a master access point with or without wires. A local area network (LAN) cable (not shown) or other components are also included in the facility communicator 6. Although a structure including multiple access points AP is described herein, the communication system 1 may simply include a single access point AP based on, for example, the area size of the facility and the radio wave intensity at the access point AP.

Each vehicle 30 further includes a vehicle position detector 32 that obtains information (vehicle position information) on the position of the vehicle 30 (vehicle position). The vehicle position information is provided to the facility controller 5 through communication. The facility controller 5 can identify the positions of all the vehicles 30 in the article transport facility 100. The facility controller 5 determines a vehicle 30 that is to transport an article based on the vehicle position information on each vehicle 30 as well as, for example, a travel distance or congestion on the travel path 10, and transmits a transport command to the vehicle 30 through communication. Each vehicle 30 includes the vehicle controller 31. The vehicle controller 31 causes the vehicle 30 to travel under autonomous control based on the transport command and stops the vehicle 30 above the designated mount to transfer the article while causing the article support to be raised or lowered.

For example, the travel rails have multiple marks indicating positional information indicating absolute positions in the article transport facility 100 along the travel path 10. These marks indicate absolute coordinates of the travel path 10 in the article transport facility 100 with linear or two-dimensional bar codes. The vehicle position detector 32 includes, for example, a code reader that reads the bar codes. The vehicle position detector 32 reads the marks with the code reader to obtain the positional information. The vehicle 30 may further include an encoder that detects the rotation rate of the travel wheels. Between the marks indicating the positional information, the amount of movement of each vehicle 30 is detectable based on the rotation rate detected by the encoder, and the position of the vehicle 30 (vehicle position) on the travel path 10 can be specified with a higher resolution than the intervals between the marks. In a structure including such an encoder, the encoder is also included in the vehicle position detector 32. In place of a code reader or an encoder, for example, radio-frequency (RF) tags may be installed on the travel rails, and an RF receiver may be installed on the vehicle 30 to detect the vehicle position with an RF identification tag (RFID) system through near-field radio communication.

Each vehicle 30 further includes various sensors that detect the state or the behavior of the vehicle 30, such as a speed sensor to detect the travel speed of the vehicle 30, an accelerator sensor to detect acceleration, a sensor to detect vibrations of the vehicle 30, a sensor to detect a distance from another vehicle 30 traveling ahead, a temperature sensor, an obstacle sensor, and a sensor that detects the voltage or current of power fed from the power receiver to the components of the vehicle 30. FIG. 2 shows a sensor 33 as a typical example of these sensors.

Figure 3:
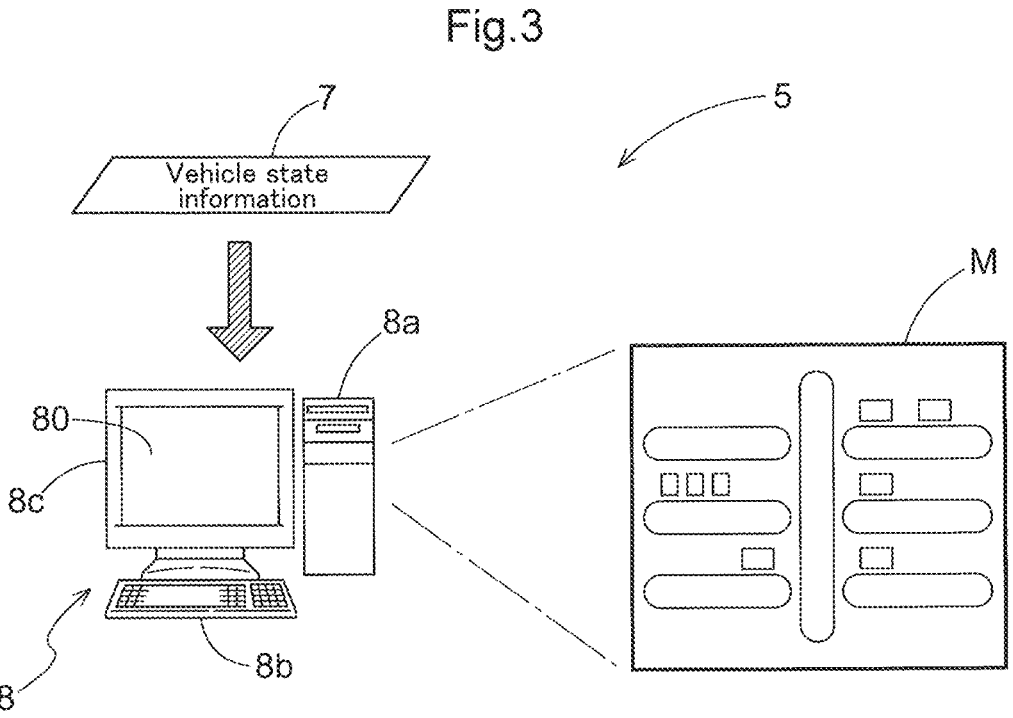
FIG. 3 is a schematic conceptual diagram of a facility controller showing its system configuration.

As described above, each vehicle 30 provides the vehicle position information to the facility controller 5 through communication. Information detected by each vehicle 30 with various sensors 33 can also be provided to the facility controller 5 through communication. The vehicle position information or the information detected by the sensor 33 is herein referred to as vehicle information. The vehicle state information 7 shown in FIG. 3 is vehicle information in a specific period (target period described later) as described later.

Each vehicle 30 periodically transmits the vehicle information to the facility controller 5. The facility controller 5 thus periodically obtains vehicle information on each vehicle 30. The vehicle controller 31 transmits the vehicle information to the facility controller 5 through the vehicle communicator 36 in each cycle set in the program, and the facility controller 5 periodically obtains the vehicle information. In other words, the facility controller 5 obtains vehicle information at data obtaining points SP (strobe points) set in, for example, the program (refer to FIG. 7). The obtained vehicle information is at least temporarily stored into the facility controller 5. The vehicle information may be stored using a recorder 4 (described later) or stored into a different storage medium (a disk drive or a memory).

The data obtaining points may not be at precisely regular intervals. For example, the facility controller 5 and the vehicle controllers 31 may be synchronized to share common time information. The vehicle information transmitted from each vehicle 30 may include time information to be provided to the facility controller 5. Although the data obtaining points SP are not at regular intervals, when the vehicle information includes time information indicating the common time, the vehicle information appropriately corresponding to the time elapse is recorded in the recorder 4. When the vehicle position information and the time information are linked, the travel speed of the vehicle 30 is detectable through calculation based on the vehicle position information and the time information.

In wireless communication such as radio communication, communication failures may occur when a shield against radio waves is located between communicating parties, or when communication is performed with many terminals, or in other words, when traffic congestion occurs. In addition to communication interruption, the communication failures include no response, from a receiver, to a message transmitted from a transmitter over a predefined time period (or in other words, time-out), and no response to a first transmitted message with a response to a second or third message transmitted after the time-out. The number of times a message is to be repeatedly transmitted may be predetermined.

For safety in such communication failures, the vehicle control system 50 may transmit travel commands to cause the vehicle controller 31 to stop its vehicle 30 or to cause the facility controller 5 to stop other vehicles 30 traveling near the vehicle 30 that has caused a communication failure. However, the above communication failures are often recovered when the vehicle 30 moves. When the vehicles 30 stop more frequently, the travel efficiency of the vehicles 30 in the vehicle control system 50 is more likely to decrease. As in the present embodiment, when the vehicle control system 50 is included in the article transport facility 100, the stops of the vehicles 30 lower the operating rate of the article transport vehicle or the transport efficiency of the article transport facility 100. Communication failures are highly likely to be reproduced at some locations or time. When the cause of such highly reproducible communication failures is clarified and measures are taken against the clarified cause, the communication quality of the communication system 1 in the vehicle control system 50 can be improved. To improve the communication quality of the communication system 1, the vehicle control system 50 according to the present embodiment can appropriately analyze or investigate the situations or the causes of communication failures between the facility controller 5 and the multiple vehicles 30.

More specifically, the facility controller 5 includes a communication state determiner 3 that determines the communication state between the facility communicator 6 and the vehicle communicator 36 in each of the vehicles 30. When the communication state determiner 3 determines that the communication state between the facility communicator 6 and the vehicle communicator 36 in any of the vehicles 30 has a failure, the facility controller 5 sets the vehicle 30 that has caused the communication failure as a target vehicle 30T. The facility controller 5 further sets a target period including at least one of a failure-occurrence point Q1 or a failure-recovery point Q2 of the communication failure (refer to FIG. 7). In the example shown in FIG. 7, a period from a time t2 corresponding to the failure-occurrence point Q1 to a time t3 corresponding to the failure-recovery point Q2 can be set as the target period. The target period may include the failure-occurrence point Q1 alone or the failure-recovery point Q2 alone.

Instead of the moment at which a communication failure occurs and the moment at which the communication failure is recovered, the failure-occurrence point Q1 and the failure-recovery point Q2 may be specified at the data obtaining points SP. More specifically, when the vehicle information that has been periodically obtained at the data obtaining points SP cannot be obtained appropriately at a specific data obtaining point SP, the time corresponding to the specific data obtaining point SP at which the information cannot be obtained is specified as the failure-occurrence point Q1 of the communication failure. Similarly, when the vehicle information that has not been obtained appropriately at any of the data obtaining points SP is appropriately obtained at a specific data obtaining point SP, the time at the specific data obtaining point SP at which the information is obtained is specified as the failure-recovery point Q2 of the communication failure.

The facility controller 5 may determine, as the failure-occurrence point Q1 of the communication failure, the time at which the facility controller 5 determines that no response is received after transmitting a transport command (travel command) to a vehicle 30 and receiving no response to the command from the vehicle 30 (when the time-out is determined). The facility controller 5 may determine, as the failure-occurrence point Q1, the time at which the facility controller 5 transmits the command.

As described above, to specify the failure-occurrence point Q1 and the failure-recovery point Q2 at specific data obtaining points SP, the target period includes at least one data obtaining point SP. The facility controller 5 obtains vehicle information indicating the state of the target vehicle 30T at the at least one data obtaining point SP in the target period, and records the vehicle information in the recorder 4 as the vehicle state information 7. The recorder 4 is a database for analyzing the communication failure using an analysis program 55 (refer to FIGS. 4 to 6) described later. The recorder 4 includes a nonvolatile recording medium such as a hard disk drive (HDD), a solid-state disk drive (SSD), or a nonvolatile memory as the core.

As shown in FIG. 3, the facility controller 5 includes a computer such as a personal computer or a workstation including hardware such as a microprocessor, a digital signal processor, or a graphic processor as the core. FIG. 3 shows an example of the facility controller 5 including a computer system 8. The computer system 8 includes a body 8a including hardware such as a microprocessor, a digital signal processor, a graphic processor, or a recording medium (HDD, SSD, or memory) as the core, and corresponding to the calculator 2 and the recorder 4. The recorder 4 that records vehicle state information 7 is implemented by a nonvolatile recording medium (e.g., HDD or SSD) in the body 8a. The recording medium in the body 8a stores facility information indicating the structure of the article transport facility 100, such as map information M indicating the travel path 10. A keyboard 8b and a mouse (not shown) are input devices, and a display device 8c is an output device including a display 80.

As described above, in the vehicle control system 50, each vehicle 30 includes the vehicle position detector 32 that detects its position. The vehicle communicator 36 periodically transmits the vehicle position information indicating the vehicle position detected by the vehicle position detector 32 to the facility controller 5. The vehicle position information is vehicle information, and the facility controller 5 temporarily stores the vehicle position information. The facility controller 5 may temporarily store the vehicle position information into a volatile recording medium such as a dynamic random-access memory (DRAM) in the body 8a, or into a nonvolatile recording medium such as a static random-access memory (SRAM). The vehicle information stored by the facility controller 5 may be referred to as facility log information (MC LOG).

When the communication state determiner 3 determines that the communication state has a failure, for example, the facility controller 5 sets a period from a time before the failure-occurrence point Q1 to a time after the failure-recovery point Q2 as a target period. In the example shown in FIG. 7, the facility controller 5 sets a period from a time before the time t2 corresponding to the failure-occurrence point Q1 to a time after the time t3 corresponding to the failure-recovery point Q2 as the target period. For example, the facility controller 5 may obtain, as the vehicle state information 7, the vehicle position information on the target vehicle 30T at the data obtaining points SP in the target period received by the facility communicator 6. Rather than information directly obtained from the target vehicle 30T, the vehicle position information may be vehicle position information temporarily stored in the storage in the facility controller 5 as the facility log information.

Before a communication failure occurs, the facility controller 5 can receive the vehicle information. Thus, the facility controller 5 can obtain the vehicle position information on the target vehicle 30T before the communication failure occurs based on, for example, the facility log information. After the communication failure is recovered, the facility controller 5 can receive the vehicle information. Thus, the facility controller 5 can obtain the vehicle position information on the target vehicle 30T immediately after the communication failure is recovered from the target vehicle 30T. More specifically, the facility controller 5 can obtain the vehicle position information immediately before the failure-occurrence point Q1 of the communication failure and the vehicle position information immediately after the failure-recovery point Q2 of the communication failure as the vehicle state information 7.

The facility controller 5 provides a transport command including a travel command to each vehicle 30, and thus has information on a rough path of the vehicle 30. Unless a communication failure lasts for a long time and each vehicle 30 that autonomously travels can select multiple paths, the facility controller 5 can estimate a rough path on which the vehicle 30 has passed. More specifically, although the vehicle position information in a period from the failure-occurrence point Q1 of a communication failure to the failure-recovery point Q2 of the communication failure is unknown, the facility controller 5 can highly accurately estimate the travel path of the target vehicle 30T during the communication failure based on the travel command and the vehicle position information immediately before the failure-occurrence point Q1 and immediately after the failure-recovery point Q2 of the communication failure.

Figure 4:
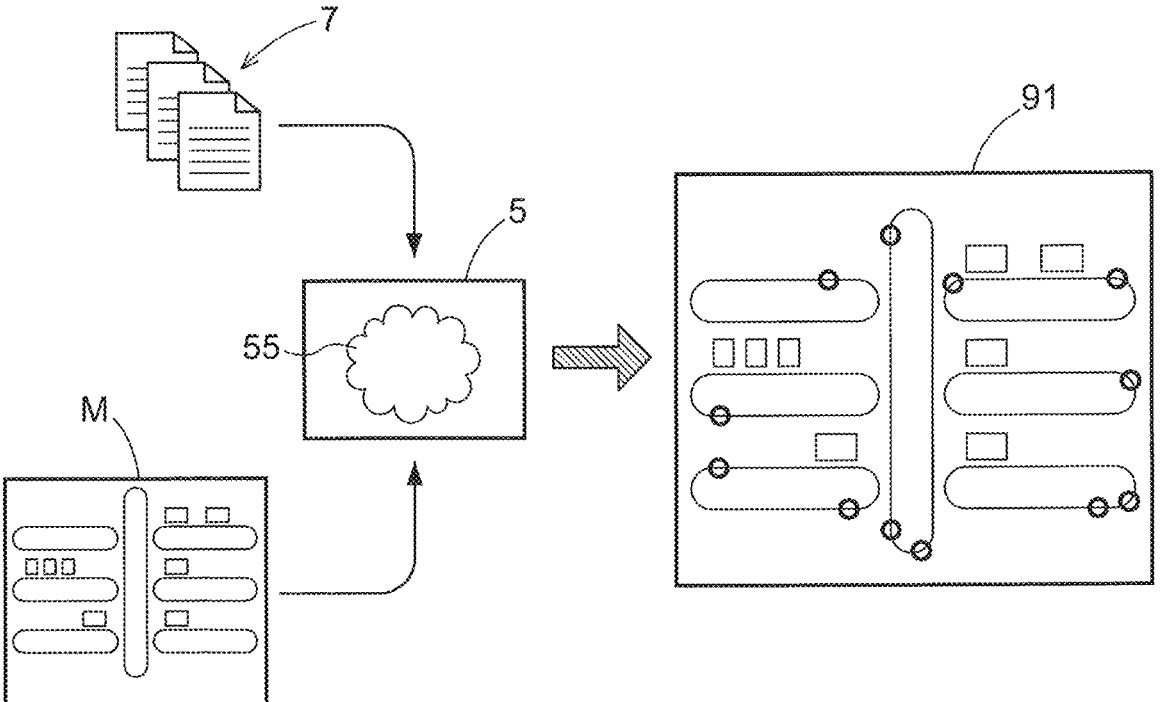
FIG. 4 is a diagram describing a first example of analysis.
Figures 5, 6:
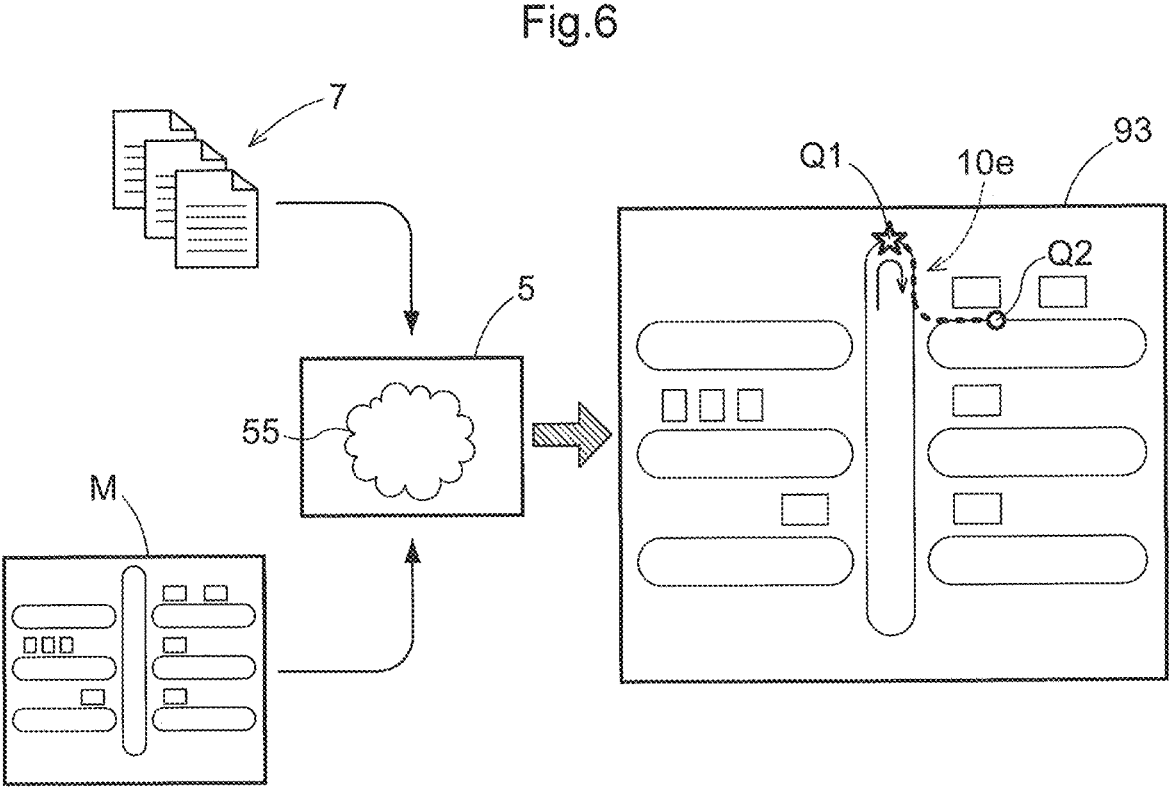
FIG. 5 is a diagram describing a second example of analysis.
FIG. 6 is a diagram describing a third example of analysis.

The facility controller 5 can further specify the path on which a communication failure has occurred based on time-series information including the vehicle position information on the target vehicle 30T before the communication failure occurs and the vehicle position information after the communication failure is recovered. For example, as shown in FIGS. 4 to 6 and other drawings, the facility controller 5 includes the analysis program 55, and the analysis program 55 can be used to analyze or investigate the situation and the cause of a communication failure resulting from the travel position of the target vehicle 30T on the travel path 10 based on the vehicle state information 7 recorded in the recorder 4. The facility controller 5 can cause the display 80 to display the vehicle state information 7 on multiple target vehicles 30T recorded in the recorder 4 in a manner superimposed on the map information M indicating the travel path 10.

As described above, the computer system 8 includes the display device 8c including the display 80. More specifically, the vehicle control system 50 includes the display 80 that displays information. For example, as shown in FIG. 4, the facility controller 5 causes the display 80 to display the vehicle state information 7 on the multiple target vehicles 30T recorded in the recorder 4 in a manner superimposed on the map information M indicating the travel path 10. FIG. 4 shows an example of a first analysis result 91 obtained using the analysis program 55. The first analysis result 91 shows the positions on the travel path 10 at which the communication failures occur with circles. Displaying the first analysis result 91 on the display 80 allows an operator to visually identify the positions at which the communication failures occur, and to perform maintenance.

The information indicated by the circles in the first analysis result 91 is information based on the vehicle state information 7 on the multiple target vehicles 30T recorded in the recorder 4, or more specifically, failure information indicating the positions on the travel path 10 at which the communication failures have occurred. More specifically, the facility controller 5 causes the display 80 to display the failure information in a manner superimposed on the map information M. The facility controller 5 may cause the failure information to be displayed in different forms based on the number of times the communication failures have occurred at the positions in the predefined period. For example, the facility controller 5 can cause the positions to be displayed with different colors, or more specifically, the position with the highest frequency with red, the position with the second highest frequency with yellow, and the position with the lowest frequency with green. Although the above example indicates the state in which the positions are displayed with three different colors, the positions may be displayed with two or four or more different colors. The difference in frequency may instead be expressed with blinking or lighting with different brightness. The difference in frequency may instead be expressed with circles with different sizes, or marks with different shapes including a circle, a triangle, and a quadrangle.

The vehicle state information 7 may further include at least one of information indicating the behavior of a vehicle (the behavior of the target vehicle 30T), detected by the sensor 33 included in the target vehicle 30T, information indicating the radio wave intensity of the facility communicator 6 (e.g., access point AP) detected by the vehicle communicator 36, information indicating the radio wave intensity of the vehicle communicator 36 in the target vehicle 30T received by the facility communicator 6 (e.g., access point AP), or attribute information indicating the attribute of the target vehicle 30T. The information indicating the behavior includes the travel speed, acceleration, deceleration, and the operation state of the article support (whether in raising or lowering operation). The attribute information includes hardware version information on the vehicle controller 31 or the vehicle communicator 36, information on the time of manufacture, software version information, and operation hours.

Based on the vehicle state information 7, the facility controller 5 can analyze the state of communication failures classified by categories. FIG. 5 shows an example of a second analysis result 92 as an example of such an analysis result. For example, the facility controller 5 causes the display 80 to display the relationship between the hardware or software version of the vehicle communicator 36 or the vehicle controller 31 that has caused a communication failure and the frequency of the communication failure, with a graph or a table. Such a graph or a table allows the operator to easily identify the cause of the communication failure, and to take measures against the failure.

As described above, each vehicle 30 includes the vehicle position detector 32. The vehicle position information detected by the vehicle position detector 32 may be linked with the time information and stored into the storage (e.g., memory) in each vehicle 30. The storage may be a nonvolatile or volatile recording medium. When the vehicle control system 50 determines a period from time before the failure-occurrence point Q1 of the communication failure to time after the failure-recovery point Q2 of the communication failure as the target period, the facility controller 5 can obtain the vehicle position information in the target period from the target vehicle 30T after the communication failure is recovered. More specifically, after the failure in the communication state between the facility communicator 6 and the target vehicle 30T is recovered, the facility communicator 6 communicates with the target vehicle 30T, and the facility controller 5 can obtain the position information on the target vehicle 30T at the data obtaining points SP in a period from the failure-occurrence point Q1 to the failure-recovery point Q2 of the communication failure as the vehicle state information 7.

Thus, although failing to obtain the position information on the target vehicle 30T in the period in which the communication state has a failure, after the communication failure is recovered, the facility controller 5 can complement the position information on the target vehicle 30T in the period. The facility controller 5 provides a travel command to the target vehicle 30T, and can thus estimate a rough path of the target vehicle 30T. Complementing the positional information on the target vehicle 30T in this manner can accurately specify the path along which the target vehicle 30T has actually traveled in the period in which the communication failure has occurred. When the path is specified in this manner, a communication failure path 10e being a path from the failure-occurrence point Q1 to the failure-recovery point Q2 of the communication failure can be displayed on the display 80 in a manner superimposed on the map information M, as shown in a third analysis result 93 in FIG. 6. The operator can easily identify the cause of the communication failure based on the display of the communication failure path 10e, and can take measures against the failure.

The facility controller 5 may obtain the position information on the target vehicle 30T at at least one data obtaining point SP in a period from the failure-occurrence point Q1 to the failure-recovery point Q2 of the communication failure as the vehicle state information 7, or obtain the information at all the data obtaining points SP as the vehicle state information 7. For example, as shown in FIG. 7, the facility controller 5 may obtain the vehicle state information 7 at the data obtaining points SP in a period from the failure-occurrence point Q1 to the failure-recovery point Q2 of the communication failure, or more specifically, at all the data obtaining points SP in a period from the time t2 to the time t3 from the vehicle log information (VC LOG) serving as information recorded in the storage in the target vehicle 30T.

Figure 7:
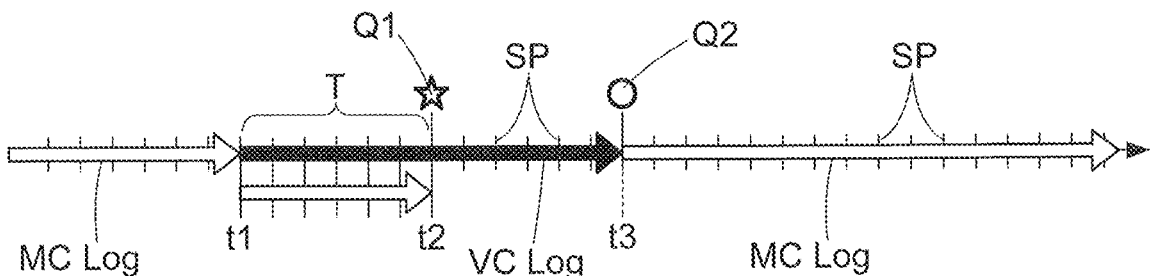
FIG. 7 is a diagram describing an example relationship between a data obtaining point and vehicle state information for a communication failure and its recovery.

For example, as shown in FIG. 7, when setting, as the target period, a period from a time before the failure-occurrence point Q1 of the communication failure, or more specifically, from a time t1 that is a period T before the time t2 corresponding to the failure-occurrence point Q1 of the communication failure, the facility controller 5 may obtain the vehicle state information 7 at the data obtaining points SP from the time t1 to the time t2 from the vehicle log information (VC LOG). No communication failure occurs from the time t1 to the time t2, and the vehicle information obtained at the data obtaining points SP is stored into the storage in the facility controller 5. More specifically, the vehicle state information 7 on the target vehicle 30T from the time t1 to the time t2 has been obtained as the vehicle information, and is stored into the facility controller 5 as the facility log information (MC LOG). The information in this period can be verified again when obtained from the vehicle log information (VC LOG) as to whether accurate information has been transmitted before a communication failure has occurred. FIG. 7 is a diagram showing information displayed in a superimposed manner in a period before the failure-occurrence point Q1 of the communication failure, but information in a period after the failure-recovery point Q2 of the communication failure may be similarly displayed in a superimposed manner.

Although the facility controller 5 is described as an example for obtaining the position information as the vehicle state information 7 in the target period, the vehicle state information 7 is not limited to the position information. The facility controller 5 may obtain the vehicle state information 7 including the entire vehicle information transmitted to the facility controller 5 when the communication is in a proper state.

As described above, the facility controller 5 provides a travel command to the target vehicle 30T, and thus can estimate the path of the target vehicle 30T in a period in which the communication failure occurs. More specifically, the facility controller 5 may estimate the positions of the target vehicle 30T at the data obtaining points SP in a period from the failure-occurrence point Q1 to the failure-recovery point Q2 based on the vehicle position information on the target vehicle 30T at the data obtaining points SP before the failure-occurrence point Q1 of the communication failure and the vehicle position information on the target vehicle 30T at the data obtaining points SP after the failure-recovery point Q2 of the communication failure, and obtain the positions of the target vehicle 30T as the vehicle state information 7. In this case, the target vehicle 30T may not transmit past information to the facility controller 5 after the communication failure is recovered. For example, when the communication has low stability although the communication failure is recovered, past information that can congest the communication traffic may not be transmitted. Thus, the position of the target vehicle 30T in the target period may be estimated.

When a temporary storage in each vehicle 30 has a full storage capacity, for example, a capacity to record information on daily operation hours of the facility, information in the target period may be provided to the facility controller 5 from the storage in the target vehicle 30T after the operation (travel) of the target vehicle 30T in the article transport facility 100 is complete.

As described above, various items of vehicle state information 7 are recorded in the recorder 4 in the facility controller 5. For example, the information includes information on the date and time of the failure-occurrence point Q1 when a communication failure has occurred, information on the position at which the communication failure has occurred (information based on the vehicle position information), information on the target vehicle 30T or the vehicle 30 that has caused a communication failure (identification information identifying the vehicle 30), hardware information (including type or version information) on the vehicle communicator 36 in the target vehicle 30T, software (firmware) version information on the vehicle communicator 36, elapse time from the failure-occurrence point Q1 to the failure-recovery point Q2 of the communication failure, the number of access points AP identified by the target vehicle 30T, and the radio wave intensity.

The recorder 4 records various items of information as logs. The analysis program 55 summarizes and analyzes the information classified by categories based on the logs. When these types of information are linked with restoration from the communication failure (e.g., natural restoration, automatic restoration including retry or software reset, or manual restoration by operator including hardware reset) or with measures taken by the operator, the effects on the communication failure can be analyzed.

The logs may be simply displayed in text data on the display 80. For example, the logs may be displayed in text with different colors by categories, or highlighted with colored backgrounds to enhance the legibility to the operator.

An overview of the vehicle control system according to the embodiment described above is provided as below.

A vehicle control system according to the present embodiment includes a plurality of vehicles that travel along a predetermined travel path, a controller that generates a travel command for each of the plurality of vehicles to control travel of the plurality of vehicles, and a communication system that communicates with the plurality of vehicles and the controller. The communication system includes a facility communicator that communicates wirelessly with the plurality of vehicles. Each of the plurality of vehicles includes a vehicle communicator that communicates wirelessly with the facility communicator. The controller includes a communication state determiner that determines a communication state between the facility communicator and the vehicle communicator in each of the plurality of vehicles, and a recorder. The controller obtains, when the communication state determiner determines that the communication state between the facility communicator and the vehicle communicator in at least one vehicle of the plurality of vehicles has a communication failure, vehicle state information indicating a state of at least one target vehicle being the at least one vehicle having the communication failure at at least one data obtaining point in a target period including at least one of a failure-occurrence point or a failure-recovery point of the communication failure, and records the vehicle state information in the recorder.

In this structure, when a communication failure occurs between any of the vehicles and the communication system, the controller obtains vehicle state information for the target period and records the information in the recorder after the communication failure is recovered. Thus, when a communication failure occurs, the vehicle state information used to analyze the situations or the causes of the failure can be automatically collected and recorded. This achieves the vehicle control system that can analyze or investigate the situations or the causes of communication failures between the controller and the multiple vehicles based on the vehicle state information recorded in the recorder.

In the vehicle control system, each of the plurality of vehicles may include a vehicle position detector that detects a position of the vehicle. The vehicle communicator may periodically transmit vehicle position information indicating the position of the vehicle detected by the vehicle position detector to the controller. When the communication state determiner determines that the communication state has a failure, the controller may obtain, as the vehicle state information, the vehicle position information on the at least one target vehicle at the at least one data obtaining point in the target period received by the facility communicator. The target period may be a period from a time before the failure-occurrence point and to a time after the failure-recovery point.

In this structure, the controller can obtain, in time series, the vehicle state information in a period from the data obtaining point before a communication failure to the data obtaining point after its recovery, including a period in which the communication failure occurs, and record the vehicle state information in the recorder. This structure can thus easily analyze or investigate the situation or the cause of a communication failure resulting from the travel position of the target vehicle.

In the vehicle control system, when the target period is a period from a time before the failure-occurrence point and to a time after the failure-recovery point, the facility communicator may communicate with the at least one target vehicle after the communication failure in the communication state with the at least one target vehicle is recovered. The controller may obtain, from the at least one target vehicle, as the vehicle state information, position information on the at least one target vehicle at the at least one data obtaining point in a period from the failure-occurrence point to the failure-recovery point.

In this structure, the controller can obtain the position information on the target vehicle at at least one data obtaining point at which the communication failure occurs, and record the position information in the recorder. Thus, the vehicle position information on the target vehicle in the period in which the communication failure has occurred is complemented as appropriate and is recorded in the recorder. This structure can thus more easily analyze or investigate the situation or the cause of a communication failure resulting from the travel position of the target vehicle.

In the vehicle control system, when the target period is a period from a time before the failure-occurrence point and to a time after the failure-recovery point, the controller may estimate a position of the at least one target vehicle at the at least one data obtaining point in a period from the failure-occurrence point to the failure-recovery point based on the vehicle position information on the at least one target vehicle at the at least one data obtaining point before the failure-occurrence point and the vehicle position information on the at least one target vehicle at the at least one data obtaining point after the failure-recovery point, and obtain the position of the at least one target vehicle as the vehicle state information.

The travel speed of the vehicle in the target period can be estimated based on, for example, the position of the target vehicle included in the vehicle state information at at least one data obtaining point before the failure-occurrence point of the communication failure and the position of the target vehicle included in the vehicle state information at at least one data obtaining point after the failure-recovery point of the communication failure. Thus, the position of the target vehicle at the data obtaining point in the period in which the communication failure occurs can be estimated. The vehicle position information on the target vehicle in the period in which the communication failure has occurred is complemented as appropriate with the estimated position information, and is recorded in the recorder. This structure can thus more easily analyze or investigate the situation or the cause of a communication failure resulting from the travel position of the target vehicle.

In the vehicle control system, the vehicle state information may further include at least one of information indicating behavior of a vehicle of the plurality of vehicles detected by a sensor included in the at least one target vehicle, information indicating radio wave intensity of the facility communicator detected by the vehicle communicator, information indicating radio wave intensity of the vehicle communicator in the at least one target vehicle received by the facility communicator, or information indicating an attribute of the at least one target vehicle.

In this structure, various items of information can be obtained and recorded in addition to the vehicle position information on the target vehicle in the target period. This structure can thus more easily analyze or investigate the situation or the cause of a communication failure occurring in the target vehicle.

The vehicle control system may further include a display that displays information. The at least one target vehicle may include a plurality of target vehicles. The controller may cause the display to display the vehicle state information on the plurality of target vehicles recorded in the recorder in a manner superimposed on map information indicating the predetermined travel path.

In this structure, when multiple target vehicles are set, including when the same vehicle has communication failures at different positions, the vehicle state information on these target vehicles can be displayed on the display in a manner superimposed on the map information indicating the travel path. In particular, when the vehicle position information included in the vehicle state information is used, this structure can more easily analyze or investigate the situation or the cause of a communication failure resulting from the travel position of the target vehicle.

In the vehicle control system, the controller may cause, based on the vehicle state information on the plurality of target vehicles recorded in the recorder, the display to display failure information indicating a position on the predetermined travel path at which the communication failure has occurred in a manner superimposed on the map information. The failure information may be displayed in different forms based on a number of times the communication failure has occurred at each position in a predefined period.

In this structure, the positions on the travel path at which communication failures are more likely to occur can be displayed in an easily recognizable manner. This structure can thus more easily analyze or investigate the situation or the cause of a communication failure resulting from the position on the travel path.

The invention claimed is:

1. A vehicle control system, comprising:
   a plurality of vehicles configured to travel along a predetermined travel path;
   a controller configured to generate a travel command for each of the plurality of vehicles to control travel of the plurality of vehicles; and
   a communication system configured to communicate with the plurality of vehicles and the controller, and
   wherein:

the communication system comprises a facility communicator configured to communicate wirelessly with the plurality of vehicles, each of the plurality of vehicles comprises a vehicle communicator configured to communicate wirelessly with the facility communicator, the controller comprises:

a communication state determiner configured to determine a communication state between the facility communicator and the vehicle communicator in each of the plurality of vehicles, a recorder, and a storage configured to temporarily store information, the controller is configured to directly obtain, from at least one vehicle of the plurality of vehicles or from the storage, when the communication state determiner determines that the communication state between the facility communicator and the vehicle communicator in the at least one vehicle has a communication failure, vehicle state information indicating a state of at least one target vehicle being the at least one vehicle having the communication failure at at least one data obtaining point in a target period including at least one of a failure-occurrence point or a failure-recovery point of the communication failure, and to record the vehicle state information in the recorder.

2. The vehicle control system according to claim 1, wherein:

each of the plurality of vehicles comprises a vehicle position detector configured to detect a position of the vehicle, the vehicle communicator periodically transmits vehicle position information indicating the position of the vehicle detected by the vehicle position detector to the controller, and when the communication state determiner determines that the communication state has a failure, the controller obtains, as the vehicle state information, the vehicle position information on the at least one target vehicle at the at least one data obtaining point in the target period received by the facility communicator, and the target period is a period from a time before the failure-occurrence point and to a time after the failure-recovery point.

3. The vehicle control system according to claim 2, wherein:

the facility communicator communicates with the at least one target vehicle after the communication failure in the communication state with the at least one target vehicle is recovered, and the controller obtains, from the at least one target vehicle, as the vehicle state information, position information on the at least one target vehicle at the at least one data obtaining point in a period from the failure-occurrence point to the failure-recovery point.

4. The vehicle control system according to claim 2, wherein:

the controller estimates a position of the at least one target vehicle at the at least one data obtaining point in a period from the failure-occurrence point to the failure-recovery point based on the vehicle position information on the at least one target vehicle at the at least one data obtaining point before the failure-occurrence point and the vehicle position information on the at least one target vehicle at the at least one data obtaining point after the failure-recovery point, and obtains the position of the at least one target vehicle as the vehicle state information.

5. The vehicle control system according to claim 2, wherein:

the vehicle state information further comprises at least one of information indicating behavior of the at least one target vehicle detected by a sensor included in the at least one target vehicle, information indicating radio wave intensity of the facility communicator detected by the vehicle communicator, information indicating radio wave intensity of the vehicle communicator in the at least one target vehicle received by the facility communicator, or information indicating an attribute of the at least one target vehicle.

6. The vehicle control system according to claim 2, further comprising:

a display configured to display information, and wherein the at least one target vehicle comprises a plurality of target vehicles, and wherein the controller causes the display to display the vehicle state information on the plurality of target vehicles recorded in the recorder in a manner superimposed on map information indicating the predetermined travel path.

7. The vehicle control system according to claim 6, wherein:

the controller causes, based on the vehicle state information on the plurality of target vehicles recorded in the recorder, the display to display failure information indicating a position on the predetermined travel path at which the communication failure has occurred in a manner superimposed on the map information, and the failure information is displayed in different forms based on a number of times the communication failure has occurred at each position in a predefined period.

\* \* \* \* \*